United States Patent [19]

Knetsch et al.

[11] 4,392,386
[45] Jul. 12, 1983

[54] FLOW RATE METER

[75] Inventors: Manfred Knetsch; Peter Romann, both of Stuttgart, Fed. Rep. of Germany

[73] Assignee: Robert Bosch GmbH, Stuttgart, Fed. Rep. of Germany

[21] Appl. No.: 306,811

[22] Filed: Sep. 29, 1981

[30] Foreign Application Priority Data

Nov. 11, 1980 [DE] Fed. Rep. of Germany ....... 3042448

[51] Int. Cl.$^3$ .............................................. G01F 1/28
[52] U.S. Cl. ................................... 73/861.76; 73/118; 123/494
[58] Field of Search ........... 73/861.76, 861.75, 118 A, 73/186; 123/454, 452, 494; 261/44 F, 50 A

[56] References Cited

U.S. PATENT DOCUMENTS

| | | | |
|---|---|---|---|
| 4,073,189 | 2/1978 | Draper | 73/861.76 |
| 4,147,146 | 4/1979 | Wessel et al. | 261/50 A X |
| 4,184,466 | 1/1980 | Nagele | 73/861.74 X |
| 4,346,589 | 8/1982 | Kienzle et al. | 73/118 A |

*Primary Examiner*—James J. Gill
*Assistant Examiner*—J. Chapman, Jr.
*Attorney, Agent, or Firm*—Edwin E. Greigg

[57] ABSTRACT

A flow rate meter is proposed which serves to ascertain the quantity of a flowing medium, in particular the quantity of air aspirated via an air intake tube by an internal combustion engine. The flow rate meter includes a measuring body which is pivotable counter to a restoring force about a bearing shaft supported in the housing in accordance with the quantity of the medium flowing therethrough. The flow rate meter further includes a damping body which is likewise pivotable about the bearing shaft and defines a damping chamber in the form of a movable wall, with respect to the flow conduit. The measuring body and the damping body are coupled rigidly to one another by means of crosspieces. The invention comprehends embodiments wherein either the damping body or the measuring body is directly connected with a hub held in a rotationally fixed manner on the bearing shaft. The housing wall about the hub is provided such that a leakage gap formed between the housing wall and the hub terminates at one end outside the damping chamber downstream of the measuring body. As a result, the harmful effects on the measuring competence of the flow rate meter which would be caused by air flowing via the leakage gap are avoided; thus, even very small flowing air quantities such as occur at low engine rpm levels can still be measured accurately.

9 Claims, 5 Drawing Figures

FLOW RATE METER

BACKGROUND OF THE INVENTION

The invention is directed to improvements in a flow rate meter having a housing, a measuring body disposed in a flow conduit and pivotable counter to a restoring force about a bearing shaft supported in the housing in accordance with the quantity of the medium flowing therethrough and a damping body, which is likewise pivotable about the bearing shaft so as to define a damping chamber, in the form of a movable wall, with respect to the flow conduit. Such flow rate meters are intended in particular for measuring the quantity of air aspirated via an air intake tube by an internal combustion engine. A flow rate meter of the foregoing general type is already known in which, because of the leakage gap between the hub and the housing wall, a small portion of the medium to be measured flows into the damping chamber and there causes an increase in pressure. This pressure increase at the damping body effects a moment in the closing direction of the measuring body; as a result, the measuring body is deflected only above a certain flow rate of the medium within the flow conduit, thus affecting a measurement of the flow rate. When the known flow rate meter is used to measure the quantity of air aspirated by an internal combustion engine via an air intake tube, the following problem arises: At the low idling rpm level which is presently desired and at the extremely low idling air quantities associated with this rpm level, the known flow rate meter is capable of making only an incorrect measurement, if at all, of these low idling air quantities. On the other hand, it is also disadvantageous that the leakage gap becomes obstructed as a result of soiling such that the characteristic curve of the flow rate meter changes during the course of operation.

OBJECT AND SUMMARY OF THE INVENTION

It is an object of the flow rate meter according to the invention that the operating range of the flow rate meter is extended to the lowest possible flow rates of a medium, and that the negative influence of the medium leaking through the gap between the hub and the housing wall, which could result in an undesired change in the characteristic curve of the flow rate meter, is avoided.

It is another object of the invention to connect the measuring body directly with the hub, having the advantage that the measuring body can be particularly stable in its mounting. This connection assures that the measuring body will not fail as a consequence of bending out of shape when it is used as an air flow rate meter in the intake tube of an internal combustion engine, even in the event of backfiring.

It is a further object of the invention to provide advantageously that the damping body can be connected by means of releasable connecting elements with the crosspieces, so that it can later be adjusted, after it is in place in the damping chamber. As a result, closer tolerances can be selected when manufacturing the flow rate meter from cast parts.

It is a still further object of the invention to connect the damping body directly to the hub and to connect the measuring body to the crosspieces by means of releasable connecting elements. As a result, it is possible to adjust the measuring body precisely in the flow conduit, and closer tolerances can be selected when manufacturing the flow rate meter from cast parts.

It is yet another object of the invention that the lateral gap between the measuring body and the lateral wall of the flow conduit can be more narrow in the area where there is only slight deflection on the part of the measuring body, while such gap can be wider in the area of greater deflection of the measuring body.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
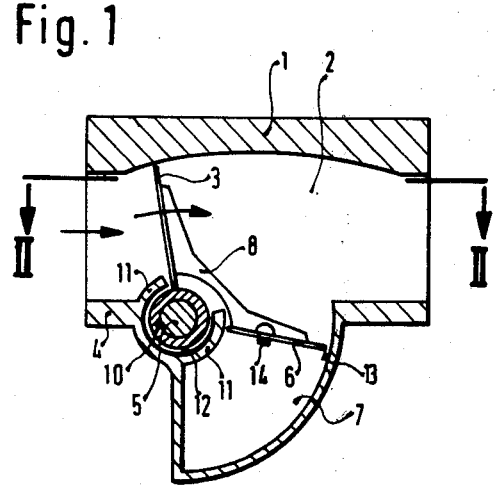
FIG. 1 is a cross-sectional view of a first exemplary embodiment of a flow rate meter.

In the flow rate meters shown by the embodiments of FIGS. 1-5, the air quantity aspirated by an internal combustion engine via an air intake tube flows in the direction of the arrow through a flow conduit 2, which is provided within a housing 1 and has a measuring valve acting as a measuring body 3, to the individual cylinders (not shown) of the engine. The measuring body 3 is pivotably supported at one side about a bearing shaft 5 in the vicinity of one wall 4 of the flow conduit 2. The bearing shaft 5 is supported in the housing 1 via ball bearings (not shown), so that the pivoting movement of the measuring body 3 is effected virtually without friction. In the specialized case where the flow rate meter is used in the air intake tube of an internal combustion engine, it is efficacious to damp pulsations by connecting the measuring valve, which is in the form of a butterfly valve, with a damping body 6, which is also in the form of a butterfly valve. The damping body 6, thus coupled, is also pivotable about the bearing shaft 5 and defines a damping chamber 7 with respect to the flow conduit 2. The damping body acts as a movable wall provided on the housing 1 outside the flow conduit 2. The connection between the measuring body 3 and the damping body 6 may be effected via crosspieces 8. The deflection of the measuring body 3 caused by the quantity of air flowing past it in the direction of the arrow takes place counter to a restoring force, by way of example, a helical spring which engages the bearing shaft 5 but is not shown. The angular position of the measuring body 3 or of the bearing shaft 5 may be sensed electrically via a potentiometer to serve as a standard for the quantity of air flowing past. In FIG. 1, the measuring body is shown in the position which it would assume during engine idling, in other words when the air flow rate is at a minimum.

Figure 3:
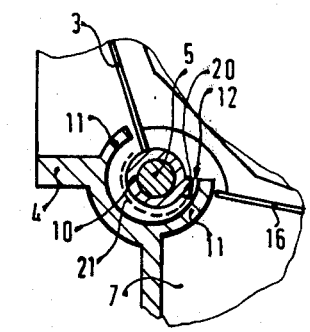
FIG. 3 is a detail of the area around the hub of the flow rate meter shown in FIG. 1.
Figure 2:
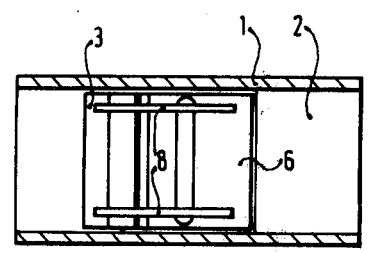
FIG. 2 is a section taken along the line II—II in FIG. 1.

A hub 10 is connected in a rotationally fixed manner with the bearing shaft 5. In the first exemplary embodiment, shown in FIGS. 1, 2, and 3, only the measuring body 3 is connected directly with the hub 10, while the damping body 6 is rigidly connected with the measuring body 3 via the crosspieces and is thus guided within the damping chamber 7. The direct connection of the measuring body 3 with the hub 10 provides a stable mounting of the measuring body 3, so that even in the case of possible backfiring in the intake tube of the engine, there will not be resultant damage to the measuring body 3 and an attendant failure of the flow rate meter. The housing wall 11 about the hub 10 is provided such that a leakage gap 12 formed between the housing wall 11 and the hub 10 extends from upstream of the measuring body 3 to downstream of the measuring body 3 outside the damping chamber 7. As a result, the damping chamber 7 communicates with the flow conduit 2 downstream of the measuring body 3 only via the circumferential gap 13 between the wall of the damping chamber 7 and the circumference of the damping body 6. In the static situation, the same pressure thus prevails in the damping chamber 7 as in the flow conduit 2 downstream of the measuring body 3. Due to the provision as above described of the leakage gap 12 between the housing wall 11 and the hub 10, leaking air is prevented from flowing through the leakage gap into the damping chamber 7 and thus from falsifying the apparent pressure in the damping chamber 7. It may be efficacious to connect the butterfly-valve-like damping body 6 with the crosspieces 8 by means of releasable connecting elements 14, for instance screws, so that an adjustment of the damping body 6 inside the damping chamber 7 is possible. As a result, closer manufacturing tolerances can be specified, especially for instance where a housing 1 is manufactured by casting. If the hub area is provided as shown in FIG. 3, the danger that the leakage gap 12 will become soiled is substantially prevented by the provision of a nose 20 on the hub 10; the narrowest portion of the leakage gap 12 lies between the nose 20 and the housing wall 11, and the side of the housing wall 11 oriented toward the nose 20 extends asymmetrically with respect to the hub 10 so that when the measuring body 3 executes an opening movement, as indicated by broken lines at 21 in the drawing, the leakage gap 12 becomes wider.

Figure 4:
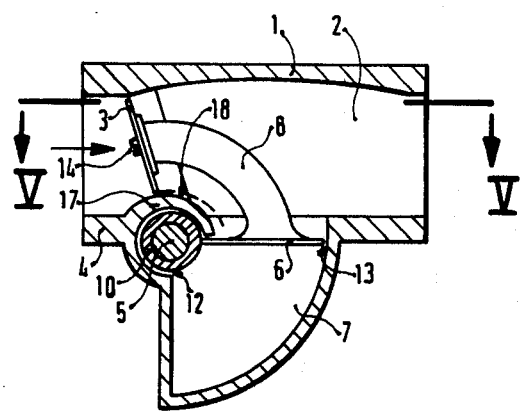
FIG. 4 is a cross-sectional view of a second exemplary embodiment of a flow rate meter.
Figure 5:
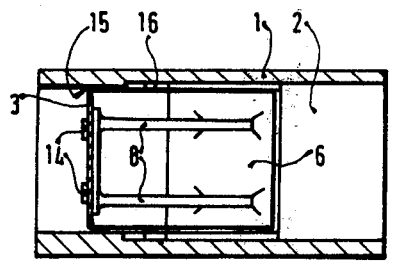
FIG. 5 is a section taken along the line V—V of FIG. 4.

In the exemplary embodiment shown in FIGS. 4 and 5, only the damping body 6 is directly connected to the hub 10; the measuring body 3 is rigidly coupled via crosspieces 8 to the damping body 6 and is guided in the flow conduit 2 when it executes a pivoting movement. The measuring body 3, provided in the form of a butterfly valve, is preferably connected with the crosspieces 8 by means of releasable connecting elements, such as screws 14, so that the measuring body 3 can be adjusted in the flow conduit 2 in order to attain the narrowest possible circumferential gaps and the best symmetrical orientation to the flow conduit 2. If the housing 1 comprises a cast part, closer manufacturing tolerances can accordingly be specified. For instance, the manufacturing tolerances can be selected such that the lateral gap 15 between the measuring body 3 and the lateral wall of the flow conduit 2 is 0.15 mm wide in the vicinity where there is a small deflection, of up to approximately 20°, on the part of the measuring body 3, while in the vicinity of a deflection greater than this, the lateral gap 16 can be approximately 0.4 mm wide. In accordance with the invention, the housing wall 17 adjacent the measuring body 3 and surrounding the hub 10 is also provided such that the leakage gap 12 formed between the measuring body 3 and the housing wall 17 extends arcuately over the hub 10 and downstream of the measuring body 3 up to the damping body 6 so that there is no exposure of the leakage gap 12 to flow conduit air. As a result, the intake tube pressure in the flow conduit 2 downstream of the measuring body 3 prevails at both ends of the leakage gap 12; this pressure is likewise established in the damping chamber 7 via the circumferential gap 13 at the damping body 6, so that there is no flow of air into the leakage gap 12 and thus no danger of soiling.

The housing wall 17 surrounding the hub 10 adjacent measuring body 3 may extend in such a way that the gap 18 (indicated by broken lines) formed between the measuring body 3 and the housing wall 17 becomes continuously larger with increasing deflection of the measuring body 3.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A flow rate meter having a housing, said housing having a flow conduit in which a measuring body is disposed, said measuring body pivotable about a bearing shaft mounted in said housing counter to a restoring force, said measuring body being arranged to pivot in accordance with a quantity of medium flowing therethrough, said flow rate meter further having a damping body pivotable about said bearing shaft so as to define a damping chamber with respect to said flow conduit, said flow rate meter being intended in particular for measuring a quantity of air aspirated via an air intake tube by an internal combustion engine, characterized in that said measuring body and said damping body are rigidly coupled to one another by means of at least one crosspiece, said measuring body and said damping body comprising flow rate elements, one of said flow rate elements being directly connected with a hub provided on said bearing shaft in a rotationally fixed manner, said housing further being provided with a wall extending arcuately about said hub, and said wall and said hub provide therebetween a leakage gap terminating at one end outside said damping chamber downstream of said measuring body.

2. A flow rate meter as defined by claim 1, further characterized in that said flow rate element directly connected with said hub is said measuring body, and said leakage gap extends from said housing upstream of the measuring body to downstream of said measuring body and exterior to said damping chamber.

3. A flow rate meter as defined by claim 2, further characterized in that said hub is provided with a nose, and said wall extends arcuately about said hub such that as said measuring body is deflected, said leakage gap progressively becomes wider.

4. A flow rate meter as defined by claim 3, further characterized in that said damping body is connected with said at least one crosspiece by means of releasable connecting elements.

5. A flow rate meter as defined by claim 1, further characterized in that said flow rate element connected directly with said hub is said damping body and the leakage gap extends from said damping chamber to downstream of the measuring body exteriorly of said damping chamber.

6. A flow rate meter as defined by claim 5, further characterized in that said measuring body is connected with said at least one crosspiece by means of releasable connecting elements.

7. A flow rate meter as defined by claim 6, further characterized in that said flow conduit includes lateral walls, at least one of which walls defines a lateral gap with said measuring body, and further wherein said lateral gap varies in width with deflection of said measuring body, and said lateral gap is narrow with low deflection and widens as said measuring body is deflected by higher than idling air flow rates.

8. A flow rate meter as defined by claim 7, further characterized in that said housing wall extending arcuately about said hub extends asymetrically about said hub, and said measuring body and said housing wall form therebetween a gap, whereby said gap becomes continuously larger with increasing deflection of said measuring body.

9. A flow rate as defined by claim 1, further characterized in that said measuring body and said damping body comprise butterfly valves.

* * * * *

UNITED STATES PATENT AND TRADEMARK OFFICE
CERTIFICATE OF CORRECTION

PATENT NO. : 4,392,386
DATED : July 12, 1983
INVENTOR(S) : Manfred Knetsch and Peter Romann It is certified that error appears in the above-identified patent and that said Letters Patent are hereby corrected as shown below:

Column 3, lines 65 and 66, delete "measuring body 3" and substitute therefor ---hub 10---.

Signed and Sealed this

Twentieth Day of March 1984

[SEAL]

Attest:

Attesting Officer

GERALD J. MOSSINGHOFF
Commissioner of Patents and Trademarks